March 6, 1928. 1,661,432
R. A. LINCOLN
COCK
Filed April 27, 1926
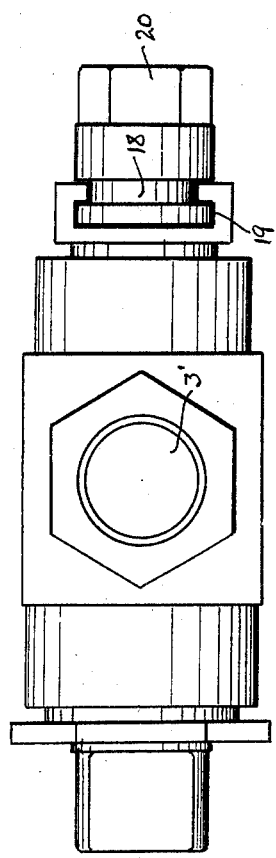
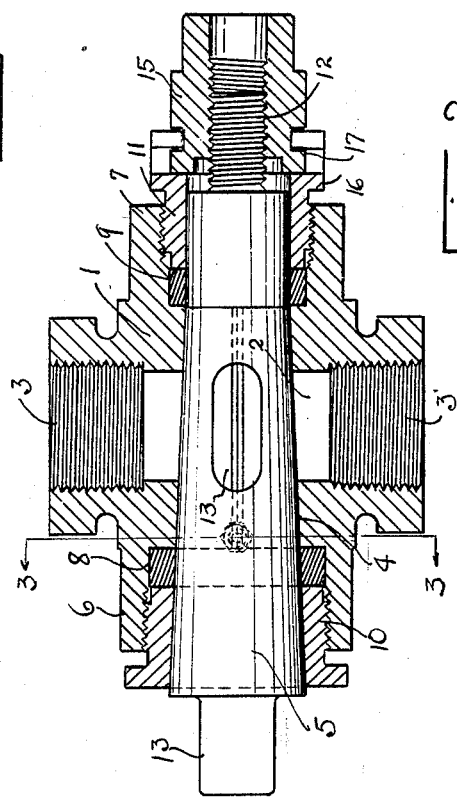
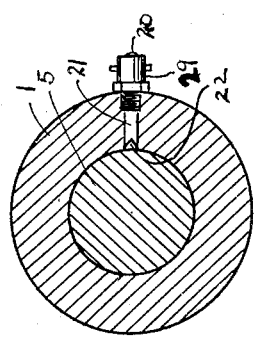
Robert A. Lincoln, Inventor
By Jesse R. Stone, Attorney Patented Mar. 6, 1928.

1,661,432

UNITED STATES PATENT OFFICE.

ROBERT A. LINCOLN, OF TONKAWA, OKLAHOMA.

COCK.

Application filed April 27, 1926. Serial No. 104,884.

My invention relates to cocks and has particular application to cocks employed in liquid conducting pipes in the handling and storage of crude oil in oil field operations.

In the cocks and other valves employed in liquid conducting pipes it is common practice when the valve is turned to closed position, to tighten the valve plug in its seat to prevent leakage. A valve so closed becomes stuck in its seat so that when it later becomes necessary to open it, the nut upon the valve plug must be loosened and the plug driven from its seat with a hammer before it can be turned. This may injure the valve and a valve thus treated will have to be repaired or renewed at intervals.

It is an object of my invention to provide a cock which may be easily made tight to avoid leakage, but which may be loosened and opened thereafter without difficulty by the use of an ordinary wrench. It is desired to avoid the necessity of hammering the valve or subjecting it to rough usage which might cause injury thereto.

Referring to the drawing herewith, Fig. 1 is a side elevation of a cock employing my invention. Fig. 2 is a plan view in central horizontal section of the cock shown in Fig. 1. Fig. 3 is a section on the plane 3—3 of Fig. 2. Like numerals of reference designates like parts in all views.

In the drawing, I have illustrated a cock having an outer casing 1 with a central fluid conducting passage 2 therethrough, the ends 3 and 3' of which are threaded for connection with a pipe.

The casing 1 has a valve seat 4 to receive the plug 5 extending diametrically of the passage 2. To accommodate the valve plug the casing 1 is extended on each side of the seat and the extensions 6 and 7 thus formed are recessed at their ends about the plug at 8 and 9 to accommodate packing rings of compressible material. Glands 10 and 11 are screwed in said recesses about the plug to set said packing.

The valve plug 5 is tapered in the usual manner, the smaller end being made cylindrical within the gland 11 and then further reduced and threaded at 12. Said valve plug has a diametrical opening 13 therein which, when said plug is turned to register with the passage 2, will allow the flow of liquid. When turned to a position at right angles from open position, as shown in Fig. 2, the valve is closed. The valve may be rotated to and from its open position by means of a wrench and a wrench hold 13 of any polygonal shape on its larger end may serve to receive the wrench.

The valve plug may be moved longitudinally in its seat to tighten or release the same by means of a nut 15 on its smaller end 12. Said nut 15 and the gland 11 are constructed so as to engage rotatably together. The gland has its outer end formed into a head 16 which has a transverse morticed slot 17 across the outer end.

The inner end of the nut 15 has an annular groove 18 adjacent its end, thus providing a ridged head 19 rotatable within the slot 17 in the gland. The forward end of the nut is provided with flattened sides, at 20, to receive a wrench.

When the packing glands 10 and 11 are properly screwed within their recesses, the head 19 of the nut 15 is moved into the slot 17 and the valve plug may then be inserted to screw within the nut 15. The glands may then be tightened, as desired, to distend the packing 8 and 9, and the nut 15 is then screwed upon the threaded end 12 of the valve to draw the valve plug tightly into its seat to retain the valve against leakage. As the nut is held by its engagement with the gland 16 from longitudinal movement relative to the valve casing, it will be noted that when the nut is unscrewed, it will cause the valve plug to be moved out of its seat and thus loosen the said plug, when it is desired to rotate it again. No pounding of the valve plug with a hammer or other tool will be required. The operator will need nothing but a wrench to both loosen and turn the valve, as desired.

In order to assist in preventing the valve from becoming stuck in its closed position so that it will not rotate and also to prevent wear, I may lubricate the valve by placing on one end of the housing the lubricator valve 29, this valve being a common type of lubricator cup adapted to be clamped to the end of a grease gun so that grease or other lubricant may be forced past the valve shown at 20 and into the channel 21 leading to a groove 22 extending longitudinally of the housing on the side of the valve opening at right angles to the passage 2 through the valve. Thus when the valve core 5 is turned into opened position, the groove 22 which extends longitudinally of the core will provide a channel through which the lubricant may be forced so as to feed the same to the packing 8 and 9 at each end of the valve plug.

This construction will be of obvious advantage to the oil field worker, both in its saving of time and in convenience, but also in preventing injury to the valve.

What I claim as new and desire to protect by Letters Patent is:

1. In a device of the character described, a casing having a fluid passage therethrough, a tapered valve plug in said passage transversely thereof, packing glands at each end of said plug, a nut having threaded engagement with the smaller end of said plug, said nut being rotatably connected with the adjacent gland to prevent movement of said nut longitudinally relative to said gland for the purpose set forth.

2. In a device of the character described, a casing having a passage for liquid therethrough, a tapered valve plug in said passage formed to open or close said passage, means at the larger end of said tapered plug for rotation thereof, a nut upon the smaller end, and means rotatably connecting said nut and said casing to prevent longitudinal movement of said nut relative to said casing.

3. In a device of the character described, a casing having a passage for liquid therethrough, a tapered valve plug in said passage formed to open or close said passage, means at the larger end of said tapered plug for rotation thereof, a nut upon the smaller end, and means rotatably connecting said nut and said casing to prevent longitudinal movement of said nut relative to said casing, said means comprising a gland in said casing about said plug and a head on said nut engaging said gland.

In testimony whereof I hereunto affix my signature this 2nd day of April, A. D. 1926.

ROBERT A. LINCOLN.